United States Patent
Park et al.

(10) Patent No.: US 11,336,635 B2
(45) Date of Patent: May 17, 2022

(54) SYSTEMS AND METHODS FOR AUTHENTICATING DEVICE THROUGH IOT CLOUD USING HARDWARE SECURITY MODULE

(71) Applicant: CIOT, Seongnam-si (KR)

(72) Inventors: Hyeon Ju Park, Yongin-si (KR); Han Na Park, Incheon (KR)

(73) Assignee: CIOT, Seongnam-si (KR)

( * ) Notice: Subject to any disclaimer, the term of this patent is extended or adjusted under 35 U.S.C. 154(b) by 89 days.

(21) Appl. No.: 16/724,207

(22) Filed: Dec. 21, 2019

(65) Prior Publication Data

US 2021/0152545 A1  May 20, 2021

(30) Foreign Application Priority Data

Nov. 18, 2019  (KR) .......................... 10-2019-0147924
Dec. 19, 2019  (KR) .......................... 10-2019-0171024

(51) Int. Cl.
*H04L 29/06* (2006.01)
*H04W 12/06* (2021.01)

(52) U.S. Cl.
CPC ...... *H04L 63/0823* (2013.01); *H04L 63/0442* (2013.01); *H04W 12/06* (2013.01)

(58) Field of Classification Search
CPC .......... G06F 21/44; G06F 21/62; G06F 21/73; G06F 21/86; G06F 21/33; G06F 21/72; H04L 9/08; H04L 9/0816; H04L 9/0819; H04L 9/0825; H04L 9/0866; H04L 9/0877; H04L 9/3263; H04L 63/0823; H04L 63/0442; H04L 63/0853; H04L 63/0876; H04L 2209/127; H04L 9/0861; H04L 9/3234; H04L 63/0435; H04L 9/006;

(Continued)

(56) References Cited

U.S. PATENT DOCUMENTS 6,854,056 B1 *  2/2005  Benantar ............... H04L 9/3263
                                                        380/282
7,484,089 B1 *  1/2009  Kogen .................. H04L 63/062
                                                        713/156

(Continued)

FOREIGN PATENT DOCUMENTS

KR   10-0991658 B1   11/2010
KR   10-1688812 B1   12/2016

OTHER PUBLICATIONS

Corbett, Understanding the AWS IoT Security Model, May 11, 2017, pp. 1-10. (Year: 2017).*

(Continued)

*Primary Examiner* — Luu T Pham
*Assistant Examiner* — Jenise E Jackson
(74) *Attorney, Agent, or Firm* — Studebaker & Brackett PC (57) ABSTRACT

Provided are a system and method for authenticating a device through an Internet of Things (IoT) cloud by using a hardware security module. The system includes an IoT device connectable to a cloud which provides an IoT service and a security module connected to the IoT device and configured to generate a pair of public and private keys for authenticating the IoT device. The IoT device transmits a certificate generation request including the public key and a device identifier to an authentication server through the cloud in order to generate a device certificate.

5 Claims, 5 Drawing Sheets

(58) Field of Classification Search
CPC ............ H04W 12/06; H04W 12/0471; H04W 12/0431; H04W 12/71; H04W 12/069
USPC ........................................................ 713/156
See application file for complete search history.

(56) References Cited

U.S. PATENT DOCUMENTS

| | | | | |
|---|---|---|---|---|
| 8,881,257 | B2* | 11/2014 | Cha | G06F 21/57 |
| | | | | 726/10 |
| 10,447,683 | B1* | 10/2019 | Loladia | H04W 12/63 |
| 10,621,350 | B2* | 4/2020 | Novak | G06F 21/33 |
| 11,042,609 | B2* | 6/2021 | Pala | G06F 21/44 |
| 2008/0170697 | A1* | 7/2008 | Heinonen | H04L 9/3263 |
| | | | | 380/277 |
| 2014/0208096 | A1* | 7/2014 | Brandwine | G06F 21/602 |
| | | | | 713/156 |
| 2017/0195318 | A1* | 7/2017 | Liu | H04L 67/2809 |
| 2018/0191508 | A1* | 7/2018 | Scriber | G06F 21/57 |
| 2019/0253254 | A1* | 8/2019 | Brownlee | G06K 19/0725 |
| 2020/0382294 | A1* | 12/2020 | Pilozzi | H04L 9/3226 |

OTHER PUBLICATIONS

Won et al, Decentralized Public Key Infrastructure for Internet-of-Things, IEEE, Oct. 31, 2018, pp. 1-7. (Year: 2018).*

O. Jukic et al., Cloud-Based Services for the Internet of Things, May 25, 2018, IEEE, pp. 372-377. (Year: 2018).*

Chollet et al, Secure IoT for a Pervasive Platform, Mar. 23, 2018, IEEE, pp. 113-118. (Year: 2018).*

* cited by examiner

SYSTEMS AND METHODS FOR AUTHENTICATING DEVICE THROUGH IOT CLOUD USING HARDWARE SECURITY MODULE

CROSS-REFERENCE TO RELATED APPLICATION

This application claims priority under 35 U.S.C. § 119 to Korean Patent Application No. 10-2019-0147924, filed in the Korean Intellectual Property Office on Nov. 18, 2019, and Korean Patent Application No. 10-2019-0171024, filed in the Korean Intellectual Property Office on Dec. 19, 2019, the entire contents of which are hereby incorporated by reference.

TECHNICAL FIELD

The present disclosure relates to a device authentication system and method in an Internet of Things (IoT) cloud and more particularly, to a system and method for generating a pair of device public and private keys for IoT device authentication by using a hardware security module (HSM) and authenticating a device by generating a device certificate with the generated public key and a device identifier (ID) through a cloud.

BACKGROUND

In general, Internet of Things (IoT) refers to a technology or an environment for collecting data of objects or the surroundings thereof by using a device with limited resources, such as a sensor, and transmitting and receiving the collected data through a wireless network. IoT is being applied to and used in various fields. For example, IoT provides a method for managing and monitoring various pieces of data of manufacturing facilities, such as a smart factory, medical equipment for real-time diagnosis and healthcare data collection, traffic facilities, such as a smart vehicle, financial payments employing smart phones or wearable devices, and the like, in real time at a remote place.

However, most of the IoT is based on a public Internet network and wireless communication, and thus an IoT device connected to a network may be the target of a malicious attacker or may be the target of a secondary attack against a legacy system such as a cloud. Consequently, it is necessary to check security problems of devices connected to the IoT or understand security states of the devices and authenticate each of the devices.

SUMMARY

The present disclosure is directed to providing a system for authenticating a device through a hardware security module (HSM) which generates a pair of public and private keys for device authentication in an Internet of Things (IoT) security cloud.

According to an aspect of the present disclosure, there is provided a system for authenticating a device through an IoT cloud by using an HSM, the system including an IoT device connectable to a cloud which provides an IoT service, and a security module connected to the IoT device and configured to generate a pair of public and private keys for authenticating the IoT device. The IoT device transmits a certificate generation request including the public key and a device identifier (ID) to an authentication server through the cloud in order to generate a device certificate.

The IoT device may receive a device certificate generated by the authentication server according to the certificate generation request, and the security module may store the private key and the device certificate.

The security module may include a security storage configured to store the private key and the device certificate.

The IoT device may encrypt the certificate generation request and transmit the encrypted certificate generation request to the authentication server, and the authentication server may decrypt the encrypted certificate generation request and generate the device certificate according to the certificate generation request.

According to another aspect of the present disclosure, there is provided an HSM for supporting device authentication through an IoT cloud, the HSM including a microcontroller unit (MCU) including an input and output module connected to an IoT device connectable to a cloud, and a security element configured to generate a pair of public and private keys for authenticating the IoT device. The security element is configured to transmit the public key to the IoT device through the input and output module so that the IoT device may transmit a certificate generation request including the public key to an authentication server through the cloud in order to generate a device certificate.

The IoT device may receive a device certificate generated by the authentication server according to the certificate generation request, and the HSM may store the private key and the device certificate.

The HSM may further include a security storage configured to store the private key and the device certificate.

According to another aspect of the present disclosure, there is provided a method of authenticating a device through a cloud by using an HSM, the method including: providing an IoT device connectable to a cloud which provides an IoT service; generating, by a security module connected to the IoT device, a pair of public and private keys for authenticating the IoT device; and transmitting, by the IoT device, a certificate generation request including the public key and a device ID to an authentication server through the cloud in order to generate a device certificate.

The method may further include: receiving, by the IoT device, a device certificate generated by the authentication server according to the certificate generation request; and storing, by the HSM, the private key and the device certificate.

BRIEF DESCRIPTION OF THE DRAWINGS

Embodiments of the present invention will be described, by way of example only, and with reference to the following drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It should be noted that in the drawings, like components or parts may be represented by like reference numerals, if possible. In describing the present disclosure, when a detailed description about a related well-known art may obscure the gist of the present disclosure, the detailed description thereof will not be provided.

In the accompanying drawings, like or relevant components may be indicated by like reference numerals. In the following description of the embodiments, repeated descriptions of the identical or relevant components may be omitted. However, even if a description of a component is omitted, such a component is not intended to be excluded in an embodiment.

Terms used in the present disclosure will be briefly described, and then exemplary embodiments of the present disclosure will be described in detail. Terms used in the present disclosure have been selected as general terms which are widely used at present in consideration of functions in the present disclosure but may be altered according to the intent of an operator skilled in the art, a precedent, the advent of new technology, or the like. In some cases, there is a term which is arbitrarily selected by the applicant, and in this case, the meaning of the term will be described in detail in a corresponding description of the disclosure. Therefore, terms used herein should be defined on the basis of the meanings thereof and the entire content of the present disclosure instead of the simple names thereof.

In the present disclosure, singular forms include the plural forms as well unless the context clearly indicates otherwise. Also, plural forms include the singular forms as well unless the context clearly indicates otherwise.

Throughout the present disclosure, when it is described that a part is referred to as "including" a component, it should be understood that it does not exclude other components and may include other components unless particularly indicated otherwise.

In the present disclosure, the term "module" denotes a software component, a hardware component, or a combination thereof, and a module may be configured to perform a specific role or function. However, the term "module" is not limited to software or hardware. A module can be configured to be present in an addressable storage medium and configured to operate one or more processors. Consequently, examples of a module include components, such as software components, object-oriented software components, class components, and task components, processes, functions, attributes, procedures, subroutines, segments of program code, drivers, firmware, microcode, circuitry, data, databases, data structures, tables, arrays, and variables. Components and modules described herein may be combined into a smaller number of components and modules or subdivided into additional components and modules.

In the present disclosure, the term "security module" may denote a hardware component, a software component, or a combination thereof which performs an arbitrary security function, such as a key generation function for Internet of Things (IoT) device authentication, an encryption function, or a security monitoring function. Hereinafter, when a hardware security module (HSM) is described in exemplary embodiments of the present disclosure, the HSM may denote a security module which is manufactured as a lightweight HSM which may be embedded in or coupled to an IoT device.

In the present disclosure, the term "security element" may denote a hardware component which performs an arbitrary security function such as a key generation and storage function for IoT device authentication, an encryption function, an encryption acceleration function, or a security monitoring function.

In the present disclosure, the term "security storage" may denote a memory or another form of storage component which stores a certificate for IoT device authentication, firmware for performing a security function, or other security-related data.

In the present disclosure, the term "system" may refer to one or more IoT devices, computing devices, or security modules or a combination thereof. For example, a system may indicate one or more computing devices, server devices, or distributed computing devices which provide a cloud service but is not limited thereto.

In the present disclosure, the term "cloud" or "cloud environment" may refer to a cloud computing system or a cloud computing infrastructure providing expandable computing resources as a service in a network. Specifically, cloud computing may denote computing power for providing abstraction between computing resources and a technical architecture (e.g., a server, a storage, and a network) therein. With cloud computing, it is possible to provide an on-demand network access to a shared pool of configurable computing resources that can be rapidly provided while minimizing interaction with a service provider or management effort. Accordingly, in a cloud, a user can access virtual computing resources (e.g., a storage, data, an application, and a virtualized computing system) without needing to know a physical system (or the location of the system) and the like used to provide computing resources. Hereinafter, in describing various exemplary embodiments of the present disclosure, a cloud may be interchangeably used with "platform (or IoT platform)" or may refer to at least a part of a platform.

Figure 1:
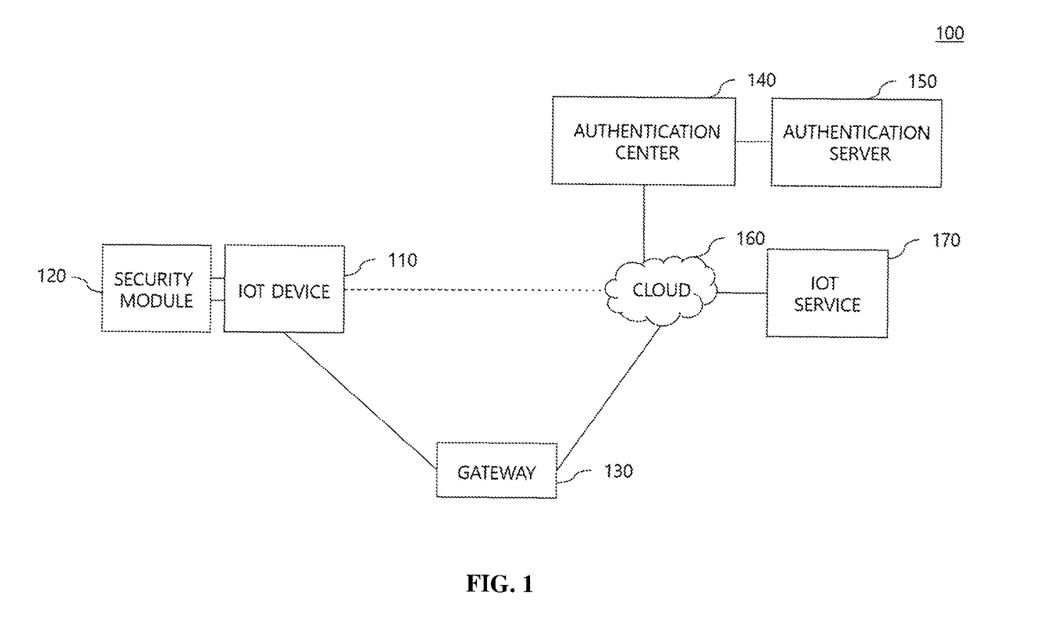
FIG. 1 is a diagram showing a system for performing device authentication through an Internet of Things (IoT) cloud according to an exemplary embodiment of the present disclosure.

FIG. 1 is a diagram showing a system for performing device authentication through an IoT cloud according to an exemplary embodiment of the present disclosure.

As shown in the drawing, a system 100 for performing device authentication in an IoT cloud may include at least one IoT device 110, an authentication center 140, an authentication server 150, a cloud 160, an IoT service (or an IoT service server) 170, a gateway 130, and a security module 120.

The IoT device 110 may be connected to the cloud 160, which is connected to the IoT service server 170, through the gateway 130. FIG. 1 shows that the IoT device 110 is connected to the cloud 160, which provides the IoT service 170, through the gateway 130, but the connection is not limited thereto. The IoT device 110 may directly access the cloud 160 without passing through the gateway 130 and receive the IoT service 170. Although the single IoT device 110 is shown in FIG. 1 for convenience of description, the number of IoT devices 110 is not limited thereto, and two or more IoT devices 110 may be connected to the cloud 160 or the gateway 130.

The cloud 160 may provide a function of connecting IoT devices, other servers, computing devices, and systems connected to the cloud 160 in a hardware manner, a function of processing a communication protocol between different devices, servers, pieces of equipment, and systems, a security and authentication function for IoT devices, services, and users, a function of gathering, visualizing, and analyzing data collected by IoT devices, and a function of integrating these functions with other services.

In an exemplary embodiment of the present disclosure, the cloud 160 may provide a function of storing and transmitting data for managing the IoT device 110. The data used for managing the IoT device 110 may include data used for IoT device onboarding, data used for IoT device management, and data used for security execution of an IoT device. For example, data stored in the cloud 160 may include an identifier (ID) of an IoT device, a session key for IoT device onboarding, IoT firewall rules used for controlling IoT device onboarding, and various pieces of data transmitted to or received from IoT devices. Also, the cloud 160 may store and transmit data of a service to be provided to the IoT device 110. For example, data stored in the cloud 160 may include data required for service registration, a service ID, a session key for service providing, and various pieces of data transmitted and received between IoT devices and the IoT service (server) 170.

The gateway 130 provides a function of transmitting and receiving data between the IoT device 110 and the cloud 160. For example, the gateway 130 may include a wireless and/or wired communication interface which may transmit data transmitted and received between the IoT device 110 and the cloud 160 through a wireless or wired communication channel. The gateway 130 may perform a communication function according to a communication protocol which constitutes a part of a wireless network including a low-power wide-area network (LPWAN), such as Wi-Fi, Bluetooth, and long range (LoRa) conforming to the Institute of Electrical and Electronics Engineers (IEEE) 802.11 standard.

The IoT service 170 may be a service device including one or more computing devices which provide various services related to the IoT device 110. For example, the IoT service 170 may provide various services including a smart home service, a smart car service, etc. to the IoT device 110 through the cloud 160. The IoT service 170 may provide a service customized for a user to the IoT device 110 through the cloud 160 in conjunction with the cloud 160, which receives device state information, sensed and collected data, user information for a service, etc. from various IoT devices (e.g., home appliances and smart car devices).

The security module 120 is a device including hardware or a combination of hardware and software which may perform security functions, such as security key generation, authentication of the IoT device 110, and encryption. For example, the security module 120 may be a hardware part, such as a circuit board, embedded in the IoT device 110 or a lightweight hardware device configured to be detachable from the IoT device 110. The security module 120 may generate a pair of public and private keys for IoT device authentication. The IoT device 110 may transmit a certificate generation request including the public key generated by the security module 120 and a device ID to the authentication center 140 through the cloud 160. A certificate generation request signal may include a message type, a message length, the device ID (e.g., the serial number of an IoT device), a gateway ID, a unique ID (UID) (e.g., the ID of a hardware chip installed in the IoT device), and the like. In this case, the certificate generation request includes information on the IoT device, and thus the certificate generation request signal may be encrypted to strengthen the security.

The authentication center 140 may be a server device including at least one computing device which serves as an authentication authority. The authentication center 140 may transmit the certificate generation request including the public key and the device ID received from the IoT device 110 to the authentication server 150.

In the exemplary embodiment, it has been described that the IoT device 110 transmits the certificate generation request to the authentication center 140 through the cloud 160, but the present disclosure is not limited to the exemplary embodiment. In another exemplary embodiment, the IoT device 110 may directly transmit the certification generation request signal to the authentication server 150 through the cloud 160.

The authentication server 150 may be a server device including at least one computing device which serves as a certification authority. The authentication server 150 may verify the public key and the device ID included in the certificate generation request received from the IoT device 110 or the authentication center 140. For example, when the IoT device 110 is onboarded on the cloud 160, corresponding device information (e.g., a device ID) may be registered in the cloud 160. Therefore, the authentication server 150 may receive the device information including the previously registered device ID from the cloud 160. The authentication server 150 may verify the validity of a corresponding device by comparing the device ID received from the cloud 160 and the device ID included in the certificate generation request received from the authentication center 140. Also, the authentication server 150 may verify the public key included in the certificate generation request through verification of the device ID.

When the certificate generation request has been encrypted, the authentication server 150 decrypts the encrypted certificate generation request. In this case, the authentication server 150 may recognize that the corresponding signal is a certificate generation request signal through the message type included in the decrypted certificate generation request signal.

When the public key and the device ID are verified, the authentication server 150 may generate a certificate. The authentication server 150 may generate a certificate including partial information of the certificate generation request signal. In an exemplary embodiment of the present disclosure, the certificate may include the device ID, the UID, a random number, a transaction ID, a valid time, a valid number of times, an access control policy, and an encryption algorithm. The transaction ID is an ID generated according to the order of the certificate generation request signal received by the authentication server 150. The valid time is the term of validity of the certificate, and the valid number of times is the number of times that an IoT device in which the certificate is stored may communicate with a gateway installed at a specific location to be used at the specific location. The access control policy indicates a gateway (or a gateway ID) which is accessible by the IoT device 110. The encryption algorithm is an encryption algorithm used for the authentication server 150 to encrypt the certificate.

Also, the authentication server 150 may generate a signed certificate by signing the generated certificate. The certificate generated by the authentication server 150 may be copied. To prevent this, the authentication server 150 may prove that the certificate has been generated by the authentication server 150 by signing the certificate.

The authentication server 150 may transmit the generated certificate to the IoT device 110 through the authentication center 140 and the cloud 160. In this case, the authentication server 150 or the authentication center 140 may encrypt the certificate to strengthen the security of the certificate. For example, the authentication server 150 or the authentication center 140 may encrypt the certificate (or signed certificate) with the encryption algorithm included in the certificate.

The IoT device 110 may store the certificate and the private key received from the authentication server 150 or the authentication center 140 in a security module 122. When the received certificate has been encrypted, the IoT device 110 may decrypt the encrypted certificate (or signed certificate). Since the certificate includes encryption algorithm information which has been used to encrypt the certificate, it is possible to decrypt the encrypted certificate by using the encryption algorithm. Also, the IoT device 110 may check the certificate before storing the certificate. Checking the certificate may be for checking the correspondence between information included in the certificate (e.g., the UID) and information included in the certificate generation request signal by comparing the pieces of information with each other.

Figure 2:
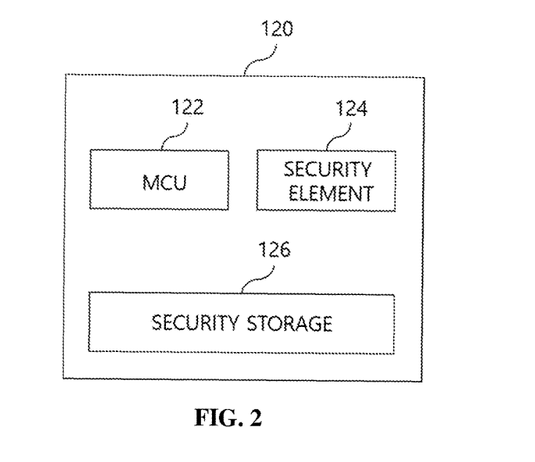
FIG. 2 is a diagram showing a detailed configuration of a hardware security module (HSM) according to an exemplary embodiment of the present disclosure.

FIG. 2 is a diagram showing a detailed configuration of an HSM according to an exemplary embodiment of the present disclosure.

As shown in the drawing, the security module 120 may include a microcontroller unit (MCU) 122, a security element 124, and a security storage 126.

The MCU 122 may refer to, for example, a hardware device which is manufactured with a microprocessor and an input and output module as one semiconductor chip and which performs a certain function. In an example, the MCU 122 may include a processor core, a memory, and a programmable I/O port. The memory of the MCU 122, such as a NOR flash memory, an erasable programmable read-only memory ROM (EPROM), or a one-time programmable (OTP) ROM, may store a machine language code which has been programmed to perform a predetermined function. Also, the memory of the MCU 122 may include a static RAM (SRAM) having a limited capacity to store variables or data for executing the machine language code.

In an exemplary embodiment of the present disclosure, the MCU 122 may execute a security manager which performs a function of managing and controlling the security element 124 and the security storage 126. The MCU 122 may store, install, and/or execute an encryption engine which performs encryption. The encryption engine may be software, hardware, or a combination thereof which executes an encryption algorithm.

The security element 124 is a hardware device for executing a function of generating a key for device authentication and an accelerator function of the encryption engine and may include a security element, such as a trusted platform module (TPM) or an HSM, which executes security functions. For example, the security element 124 may generate a pair of public and private keys for device authentication according to the public key infrastructure (PKI) scheme. FIG. 2 shows that the security element 124 is outside the MCU 122. However, the security element 124 is not limited to the configuration and may be included in the MCU 122 according to an example of implementation.

The security storage 126 may store various pieces of security data including a device authentication key, encrypted data, a device certificate, firmware, etc. generated by the MCU 122 and/or the security element 124. In an exemplary embodiment of the present disclosure, the security storage 126 may be implemented as a semiconductor memory device, such as a flash memory or a random access memory (RAM), but is not limited thereto. The security storage 126 may be configured so that the MCU 122 or the security element 124 may access only a specific storage area. Also, the security storage 126 may be configured to prevent the MCU 122, the security element 124, or an external device from accessing a non-allowed storage area.

Figure 3:
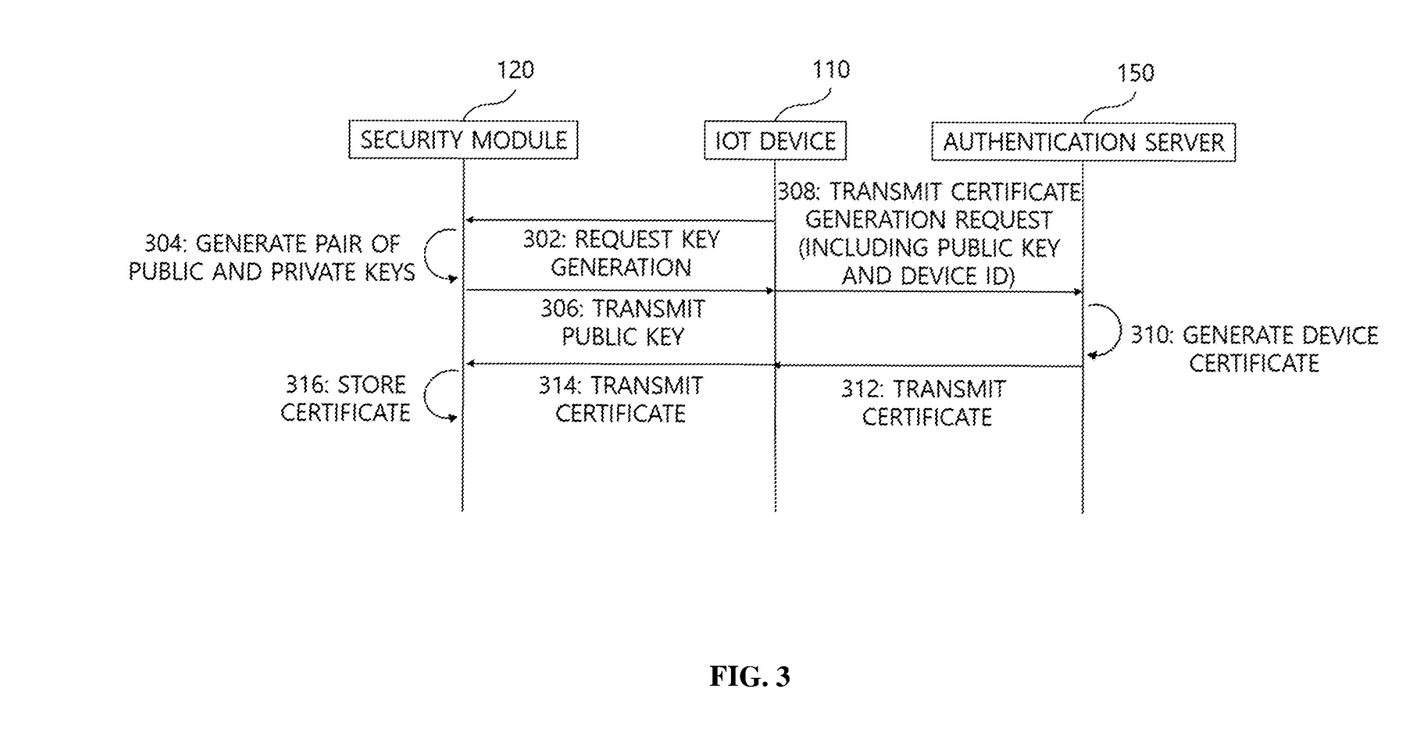
FIG. 3 is a sequence diagram showing a method of generating a device certificate by using an HSM according to an exemplary embodiment of the present disclosure.

FIG. 3 is a sequence diagram showing a method of generating a device certificate by using an HSM according to an exemplary embodiment of the present disclosure.

A method of generating a device certificate by using an HSM may start when the IoT device 110 requests the security module 120 to generate a key (302). When the key generation request is received, the security module 120 may generate a pair of public and private keys according to PKI authentication (304). Also, the security module 120 may transmit the generated public key to the IoT device 110 (306).

When the public key is received, the IoT device 110 may transmit a certificate generation request including a device ID and the public key to the authentication server 150 (308). The certificate generation request signal may include a message type, a message length, the device ID (e.g., the serial number of an IoT device), a gateway ID, a UID (e.g., the ID of a hardware chip installed in an IoT device), and the like. In this case, the certificate generation request includes information on an IoT device, and thus the IoT device 110 may encrypt the certificate generation request signal to strengthen the security.

In an exemplary embodiment of the present disclosure, the IoT device 110 may transmit the certificate generation request signal to the authentication center 140 through the cloud 160, and the authentication center 140 may transmit the certificate generation request signal to the authentication server 150. In another exemplary embodiment of the present disclosure, the IoT device 110 may directly transmit the certificate generation request signal to the authentication server 150 through the cloud 160.

Subsequently, the authentication server 150 may generate a certificate (310). In an exemplary embodiment of the present disclosure, the authentication server 150 may verify the public key and the device ID included in the certificate generation request received from the IoT device 110 or the authentication center 140. For example, when the IoT device 110 is onboarded on the cloud 160, the corresponding device information (e.g., the device ID) may be registered in the cloud 160. Therefore, the authentication server 150 may receive device information including the previously registered device ID from the cloud 160. The authentication server 150 may verify the validity of a corresponding device by comparing the device ID received from the cloud 160 and the device ID included in the certificate generation request received from the authentication center 140. Also, the authentication server 150 may verify the public key included in the certificate generation request through verification of the device ID.

When the certificate generation request has been encrypted, the authentication server 150 decrypts the encrypted certificate generation request. In this case, the authentication server 150 may recognize that the corresponding signal is a certificate generation request signal through the message type included in the decrypted certificate generation request signal.

When the public key and the device ID are verified, the authentication server 150 may generate a certificate. The authentication server 150 may generate a certificate including partial information of the certificate generation request signal. In an exemplary embodiment of the present disclosure, the certificate may include at least one of the device ID, the UID, a random number, a transaction ID, a valid time, a valid number of times, an access control policy, and an encryption algorithm. The transaction ID is an ID generated according to the order of the certificate generation request signal received by the authentication server 150. The valid time is the term of validity of the certificate, and the valid number of times is the number of times that an IoT device in which the certificate is stored may communicate with a gateway installed at a specific location to be used at the specific location. The access control policy indicates a gateway (or a gateway ID) which is accessible by the IoT device 110. The encryption algorithm is an encryption algorithm used for the authentication server 150 to encrypt the certificate.

Also, the authentication server 150 may generate a signed certificate by signing the generated certificate. The certificate generated by the authentication server 150 may be copied. To prevent this, the authentication server 150 may prove that the certificate has been generated by the authentication server 150 by signing the certificate.

The authentication server 150 may transmit the generated certificate to the IoT device 110 (312). In an exemplary embodiment of the present disclosure, the authentication server 150 may transmit the generated certificate to the IoT device 110 through the authentication center 140 and the cloud 160. In this case, the authentication server 150 or the authentication center 140 may encrypt the certificate to strengthen the security of the certificate. For example, the authentication server 150 or the authentication center 140 may encrypt the certificate (or signed certificate) with the encryption algorithm included in the certificate.

The IoT device 110 may transmit the received certificate and private key to the security module 120 and store the received certificate and private key in the security module 120 (314 and 316). In an exemplary embodiment of the present disclosure, when the received certificate has been encrypted, the IoT device 110 may decrypt the encrypted certificate (or signed certificate). Since the certificate includes encryption algorithm information which has been used to encrypt the certificate, it is possible to decrypt the encrypted certificate by using the encryption algorithm. Also, the IoT device 110 may check the certificate before storing the certificate. Checking the certificate may be for checking the correspondence between information included in the certificate (e.g., the UID) and information included in the certificate generation request signal by comparing the pieces of information with each other.

Figure 4:
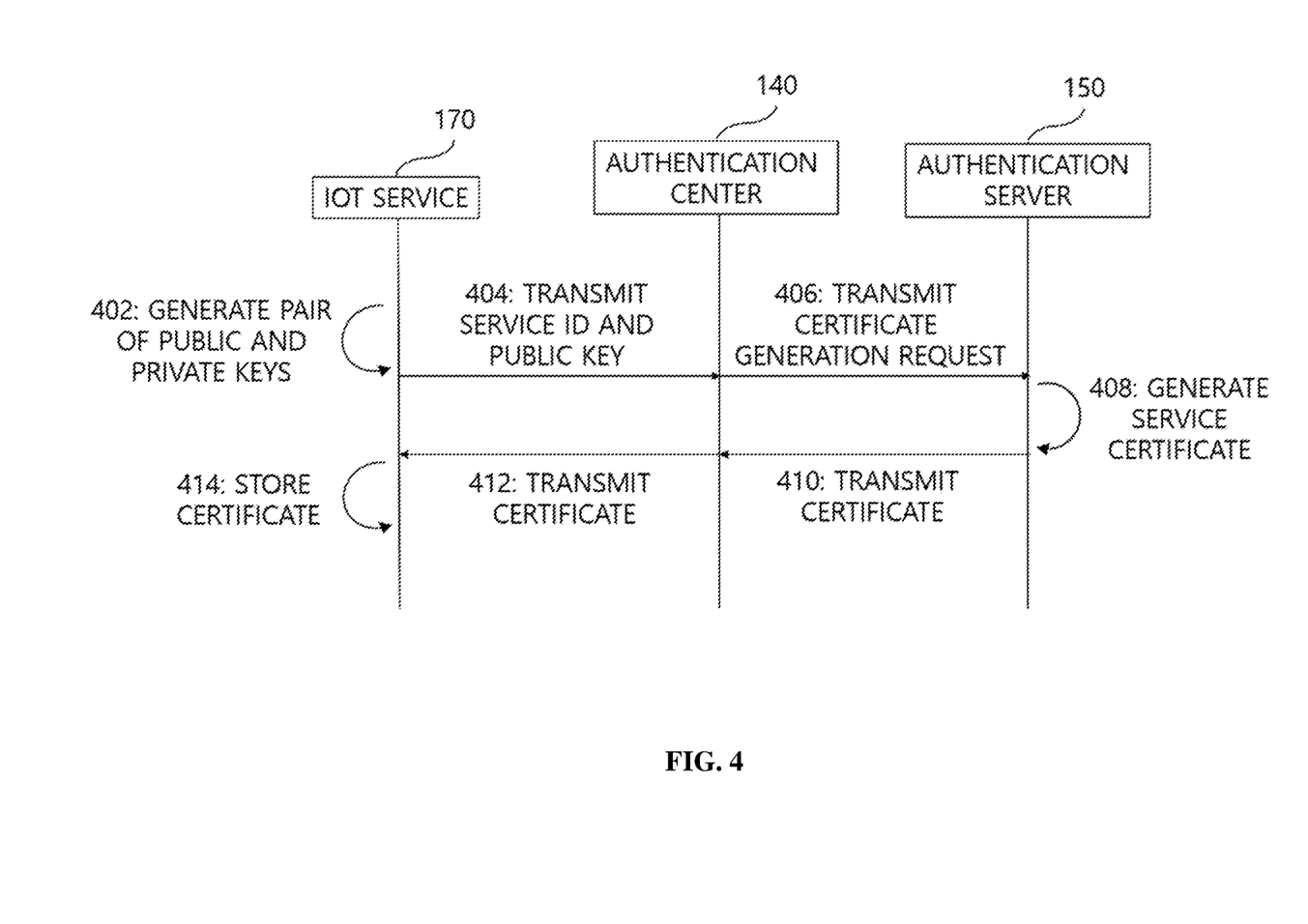
FIG. 4 is a sequence diagram showing a method of generating a service certificate according to an exemplary embodiment of the present disclosure.

FIG. 4 is a sequence diagram showing a method of generating a service certificate according to an exemplary embodiment of the present disclosure.

The IoT service server 170 may generate a pair of public and private keys to generate a service certificate (402). The IoT service server 170 may transmit a certificate generation request including a service ID and the public key to the authentication center 140 (404). The certificate generation request signal may include a message type, a message length, the service ID (e.g., the ID of an IoT service), and the like. In this case, the certificate generation request includes information on a service to be provided to an IoT device, and thus the IoT service 170 may encrypt the certificate generation request signal to strengthen the security.

Accordingly, the authentication center 140 may transmit the received certificate generation request to the authentication server 150 (406). In an exemplary embodiment of the present disclosure, the IoT service 170 may transmit the certificate generation request signal to the authentication center 140, and the authentication center 140 may transmit the certificate generation request signal to the authentication server 150.

The authentication server 150 may generate a certificate on the basis of the service certificate generation request (408). In an exemplary embodiment of the present disclosure, the authentication server 150 may verify the public key and the service ID included in the certificate generation request received from the authentication center 140. For example, information (e.g., a service ID) on a service provided by the IoT service 170 may be registered in the cloud 160 in advance. Therefore, the authentication server 150 may receive service information including the previously registered service ID from the cloud 160. The authentication server 150 may verify the validity of a corresponding service by comparing the service ID received from the cloud 160 and the service ID included in the certificate generation request received from the authentication center 140. Also, the authentication server 150 may verify the public key included in the certificate generation request through verification of the service ID.

When the certificate generation request has been encrypted, the authentication server 150 decrypts the encrypted certificate generation request. In this case, the authentication server 150 may recognize that the corresponding signal is a certificate generation request signal through the message type included in the decrypted certificate generation request signal.

When the public key and the service ID are verified, the authentication server 150 may generate a certificate. The authentication server 150 may generate a certificate including partial information of the certificate generation request signal. In an exemplary embodiment of the present disclosure, the certificate may include at least one of the service ID, a UID, a random number, a transaction ID, a valid time, a valid number of times, an access control policy, and an encryption algorithm. The transaction ID is an ID generated according to the order of the certificate generation request signal received by the authentication server 150. The valid time is the term of validity of the certificate, and the valid number of times is the number of times that an IoT service server in which the certificate is stored may communicate with an IoT device or a gateway to provide a specific service. The access control policy indicates an IoT device or a gateway (or a gateway ID) which is accessible by the IoT service 170. The encryption algorithm is an encryption algorithm used for the authentication server 150 to encrypt the certificate.

Also, the authentication server 150 may generate a signed certificate by signing the generated certificate. The certificate generated by the authentication server 150 may be copied. To prevent this, the authentication server 150 may prove that the certificate has been generated by the authentication server 150 by signing the certificate.

The authentication server 150 may transmit the generated certificate to the authentication center 140 (410). Accordingly, the authentication center 140 may transmit the certificate to the IoT service 170 (412). In an exemplary embodiment of the present disclosure, the authentication server 150 may transmit the generated certificate to the IoT service 170 through the authentication center 140 and the cloud 160. In this case, the authentication server 150 or the authentication center 140 may encrypt the certificate to strengthen the security of the certificate. For example, the authentication server 150 or the authentication center 140 may encrypt the certificate (or signed certificate) with the encryption algorithm included in the certificate.

The IoT service 170 may store the received certificate and private key (414). In an exemplary embodiment of the present disclosure, when the received certificate has been encrypted, the IoT service 170 may decrypt the encrypted certificate (or signed certificate). Since the certificate includes encryption algorithm information which has been used to encrypt the certificate, it is possible to decrypt the encrypted certificate by using the encryption algorithm. Also, the IoT service 170 may check the certificate before storing the certificate. Checking the certificate may be for checking the correspondence between information included in the certificate (e.g., the service ID) and information included in the certificate generation request signal by comparing the pieces of information with each other.

Figure 5:
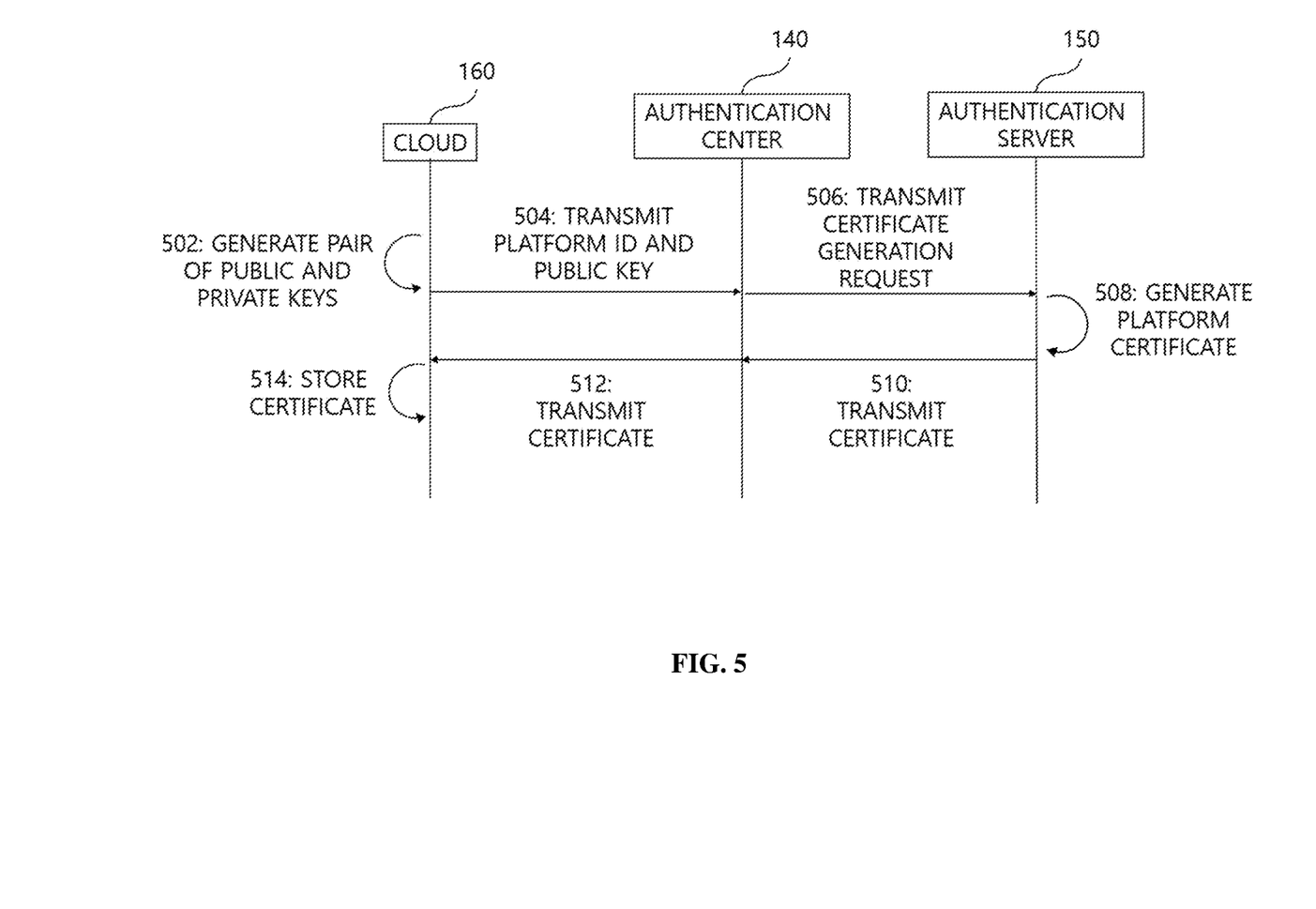
FIG. 5 is a sequence diagram showing a method of generating a platform certificate according to an exemplary embodiment of the present disclosure.

FIG. 5 is a sequence diagram showing a method of generating a platform certificate according to an exemplary embodiment of the present disclosure.

The cloud 160 (or platform) may generate a pair of public and private keys to generate a service certificate (502). The cloud 160 may transmit a certificate generation request including a platform ID and the public key to the authentication center 140 (504). The certificate generation request signal may include a message type, a message length, the platform ID (e.g., the ID of a cloud), and the like. In this case, the certificate generation request includes information on a cloud (or IoT platform) to which an IoT device will be connected, and thus the cloud 160 may encrypt the certificate generation request signal to strengthen the security.

Accordingly, the authentication center 140 may transmit the received certificate generation request to the authentication server 150 (506).

The authentication server 150 may generate a certificate on the basis of the service certificate generation request (508). In an exemplary embodiment of the present disclosure, the authentication server 150 may verify the public key and the platform ID included in the certificate generation request received from the authentication center 140. For example, when the cloud 160 or platform is initially installed, the platform ID is generated, and platform information including a platform ID may be registered in the cloud 160. Therefore, the authentication server 150 may receive the platform information including the previously registered platform ID from the cloud 160. The authentication server 150 may verify the validity of a corresponding platform by comparing the platform ID received from the cloud 160 and the platform ID included in the certificate generation request received from the authentication center 140. Also, the authentication server 150 may verify the public key included in the certificate generation request through verification of the platform ID.

When the certificate generation request has been encrypted, the authentication server 150 decrypts the encrypted certificate generation request. In this case, the authentication server 150 may recognize that the corresponding signal is a certificate generation request signal through the message type included in the decrypted certificate generation request signal.

When the public key and the platform ID are verified, the authentication server 150 may generate a certificate. The authentication server 150 may generate a certificate including partial information of the certificate generation request signal. In an exemplary embodiment of the present disclosure, the certificate may include at least one of the platform ID, a UID, a random number, a transaction ID, a valid time, a valid number of times, an access control policy, and an encryption algorithm. The transaction ID is an ID generated according to the order of the certificate generation request signal received by the authentication server 150. The valid time is the term of validity of the certificate, and the valid number of times is the number of times that a cloud in which the certificate is stored may communicate with an IoT device or a gateway to provide a specific service. The access control policy indicates an IoT device or a gateway (or a gateway ID) which is accessible by the cloud 160. The encryption algorithm is an encryption algorithm used for the authentication server 150 to encrypt the certificate.

Also, the authentication server 150 may generate a signed certificate by signing the generated certificate. The certificate generated by the authentication server 150 may be copied. To prevent this, the authentication server 150 may prove that the certificate has been generated by the authentication server 150 by signing the certificate.

The authentication server 150 may transmit the generated certificate to the authentication center 140 (510). Accordingly, the authentication center 140 may transmit the certificate to the cloud 160 (512). In an exemplary embodiment of the present disclosure, the authentication server 150 or the authentication center 140 may encrypt the certificate to strengthen the security of the certificate. For example, the authentication server 150 or the authentication center 140 may encrypt the certificate (or signed certificate) with the encryption algorithm included in the certificate.

The cloud 160 may store the received certificate and private key (514). In an exemplary embodiment of the present disclosure, when the received certificate has been encrypted, the cloud 160 may decrypt the encrypted certificate (or signed certificate). Since the certificate includes encryption algorithm information which has been used to encrypt the certificate, it is possible to decrypt the encrypted certificate by using the encryption algorithm. Also, the cloud 160 may check the certificate before storing the certificate. Checking the certificate may be for checking the correspondence between information included in the certificate (e.g., the platform ID) and information included in the certificate generation request signal by comparing the pieces of information with each other.

Figure 6:
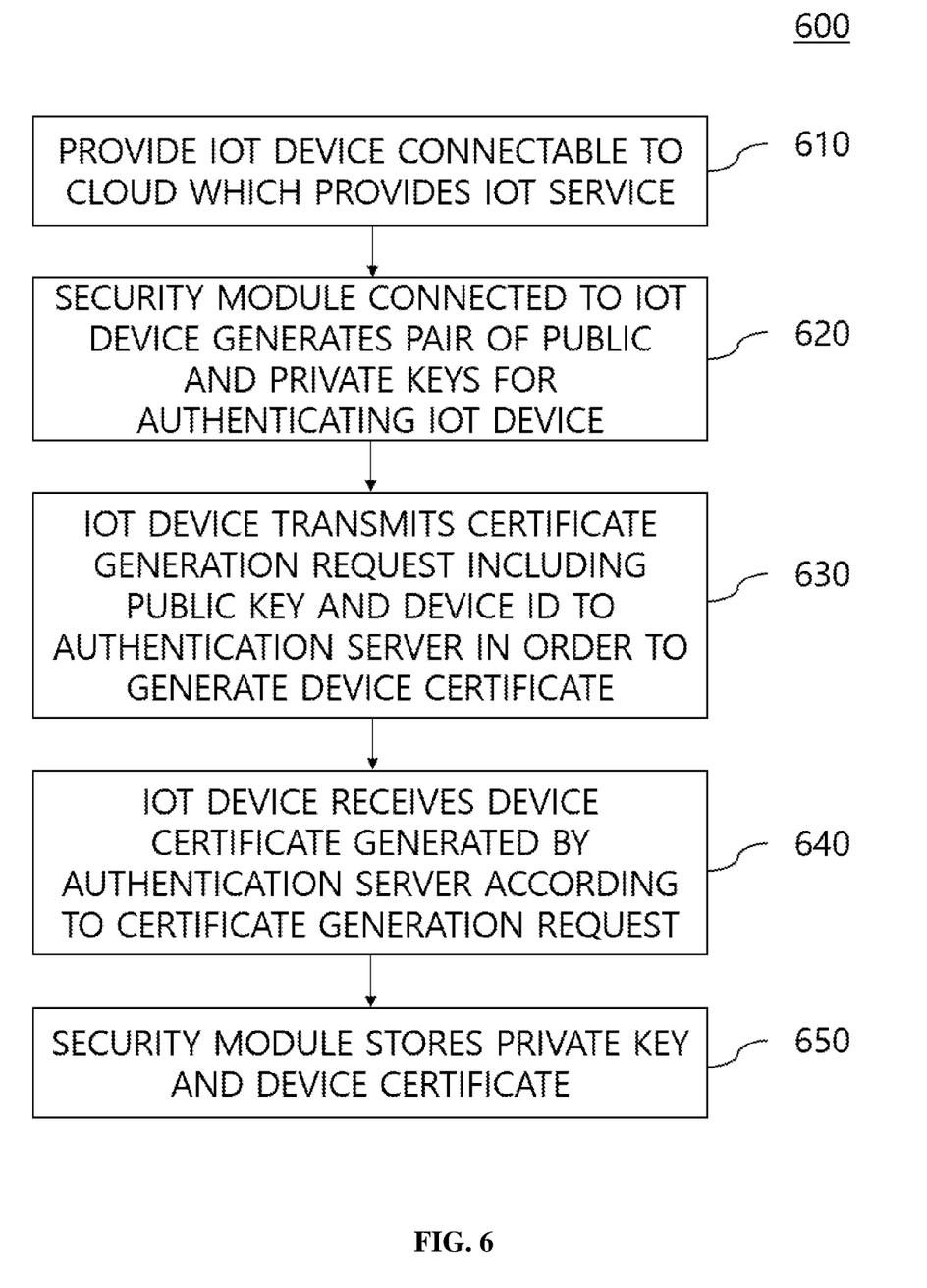
FIG. 6 is a flowchart showing a method of performing device authentication through an IoT cloud according to an exemplary embodiment of the present disclosure.

FIG. 6 is a flowchart showing a method of performing device authentication through an IoT cloud according to an exemplary embodiment of the present disclosure.

A method 600 of performing device authentication through an IoT cloud may start with an operation 610 of providing an IoT device connectable to a cloud which provides an IoT service. In an exemplary embodiment of the present disclosure, referring to FIG. 1, the IoT device 110 may be provided to be connected or connectable to the cloud 160 which provides an IoT device management function. Also, the IoT device 110 may be connected to the security module 120 which provides security functions, such as key generation and encryption, for device authentication.

Subsequently, in operation 620, the security module connected to the IoT device may generate a pair of public and private keys for authenticating the IoT device. In an exemplary embodiment of the present disclosure, referring to FIGS. 1 to 3, the device 110 may request the security module 120 to generate a key. When the key generation request is received from the IoT device 110, the security module 120 may generate a pair of public and private keys according to PKI authentication. Also, the security module 120 may transmit the generated public key to the IoT device 110.

In operation 630, the security module connected to the IoT device may transmit a certificate generation request including a device ID and the public key to the authentication server. In an exemplary embodiment of the present disclosure, referring to FIGS. 1 to 3, when the public key is received, the IoT device 110 may transmit a certificate generation request including a device ID and the public key to the authentication server 150. The certificate generation request signal may include a message type, a message length, the device ID (e.g., the serial number of an IoT device), a gateway ID, a UID (e.g., the ID of a hardware chip installed in the IoT device), and the like. In this case, the certificate generation request includes information on the IoT device, and thus the IoT device 110 may encrypt the certificate generation request signal to strengthen the security.

In an exemplary embodiment of the present disclosure, the IoT device 110 may transmit the certificate generation request signal to the authentication center 140 through the cloud 160, and the authentication center 140 may transmit the certificate generation request signal to the authentication server 150. In another exemplary embodiment of the present disclosure, the IoT device 110 may directly transmit the certificate generation request signal to the authentication server 150 through the cloud 160.

Subsequently, the authentication server 150 may generate a certificate. In an exemplary embodiment of the present disclosure, the authentication server 150 may verify the public key and the device ID included in the certificate generation request received from the IoT device 110 or the authentication center 140. When the certificate generation request has been encrypted, the authentication server 150 decrypts the encrypted certificate generation request. In this case, the authentication server 150 may recognize that the corresponding signal is a certificate generation request signal through the message type included in the decrypted certificate generation request signal.

When the public key and the device ID are verified, the authentication server 150 may generate a certificate. The authentication server 150 may generate a certificate including partial information of the certificate generation request signal. In an exemplary embodiment of the present disclosure, the certificate may include at least one of the device ID, the UID, a random number, a transaction ID, a valid time, a valid number of times, an access control policy, and an encryption algorithm. The transaction ID is an ID generated according to the order of the certificate generation request signal received by the authentication server 150. The valid time is the term of validity of the certificate, and the valid number of times is the number of times that an IoT device in which the certificate is stored may communicate with a gateway installed at a specific location to be used at the specific location. The access control policy indicates a gateway (or a gateway ID) which is accessible by the IoT device 110. The encryption algorithm is an encryption algorithm used for the authentication server 150 to encrypt the certificate.

Also, the authentication server 150 may generate a signed certificate by signing the generated certificate. The certificate generated by the authentication server 150 may be copied. To prevent this, the authentication server 150 may prove that the certificate has been generated by the authentication server 150 by signing the certificate.

In operation 640, the IoT device may the certificate generated by the authentication server according to the certificate generation request. In an exemplary embodiment of the present disclosure, referring to FIGS. 1 to 3, the authentication server 150 may transmit the generated certificate to the IoT device 110. In an exemplary embodiment of the present disclosure, the authentication server 150 may transmit the generated certificate to the IoT device 110 through the authentication center 140 and the cloud 160. In this case, the authentication server 150 or the authentication center 140 may encrypt the certificate to strengthen the security of the certificate. For example, the authentication server 150 or the authentication center 140 may encrypt the certificate (or signed certificate) with the encryption algorithm included in the certificate.

In operation 650, the security module may store the certificate and private key. In an exemplary embodiment of the present disclosure, referring to FIGS. 1 to 3, the IoT device 110 may transmit the received certificate and private key to the security module 120 and store the received certificate and private key in the security module 120. In an exemplary embodiment of the present disclosure, when the received certificate has been encrypted, the IoT device 110 may decrypt the encrypted certificate (or signed certificate). Since the certificate includes encryption algorithm information which has been used to encrypt the certificate, it is possible to decrypt the encrypted certificate by using the encryption algorithm. Also, the IoT device 110 may check the certificate before storing the certificate. Checking the certificate may be for checking the correspondence between information included in the certificate (e.g., the UID) and information included in the certificate generation request signal by comparing the pieces of information with each other.

According to various exemplary embodiments of the present disclosure, in device authentication through an IoT cloud, a security key is generated through an HSM installed in a device, and a generated certificate is stored and managed by using the security key. Consequently, in the IoT cloud, it is possible to provide a security environment which has been further strengthened in terms of device authentication.

Effects of the present disclosure are not limited to those mentioned above, and other effects not mentioned will be clearly understood by those of ordinary skill in the art from the following claims.

The apparatus or system according to the various embodiments described above may represent various types of devices, such as a desktop computer, a laptop computer, a wireless telephone, a cellular telephone, a wireless multimedia device, a personal digital assistant (PDA), a modem installed outside or inside a computer, a device communicating over a wireless channel, and the like. Such a device may have various names, such as an access terminal (AT), an access unit, a subscriber unit, a mobile station, a mobile device, a mobile unit, a mobile telephone, a mobile, a remote station, a remote terminal, a remote unit, a user device, user equipment, a handheld device, and the like. Any device described herein may include a memory for storing instructions and data required to execute the above described method of preventing distribution of illegal contents over the Internet, as well as hardware, software, firmware, or combinations thereof.

The techniques described in the present disclosure may be implemented in various devices. For example, the techniques may be implemented in hardware, firmware, software, or a combination thereof. Those skilled in the art should appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the specific application and design constraints imposed on the overall system. Skilled artisans may implement the described functionality in varying ways for each specific application, but such implementation decisions should not be interpreted as causing a departure from the scope of the present disclosure.

In the hardware implementation, processing units used to perform the techniques may be implemented in one or more application specific ICs (ASICs), digital signal processes (DSPs), digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, a computer, or in a combination thereof.

Accordingly, the various illustrative logical blocks, modules, and circuits described in connection with the present disclosure may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but, alternatively, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configurations.

In the firmware and/or software implementation, the techniques may be implemented in instructions stored in a computer-readable medium, such as a RAM, a ROM, a non-volatile RAM (NVRAM), a PROM, an EPROM, an electrically erasable PROM (EEPROM), a flash memory, a compact disc (CD), a magnetic or optical data storage device, and the like. The instructions may be implementable by one or more processors, and may allow the processor (the processors) to perform specific aspects of the function described in the present disclosure.

If implemented in software, the functions may be formed as one or more instructions or code and stored on a computer-readable medium or transmitted through the computer-readable medium. Computer-readable media include both computer storage media and communication media including any medium that facilitates transfer of a computer program from one place to another. A storage media may be any available media that may be accessed by a computer. By way of non-limiting example, such a computer-readable media may include a RAM, a ROM, an EEPROM, a CD-ROM or another optical disc storage, a magnetic disk storage or another magnetic storage device, or any other medium that may be used to carry or store desired program code in the form of instructions or data structures and that may be accessed by a computer. Also, any connection is appropriately referred to as a computer-readable medium.

If the software is transmitted from a website, server, or another remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared rays, a radio, and microwaves are included in the definition of medium. Disk and disc, as used herein, include a CD, a laser disc, an optical disc, a digital versatile disc (DVD), a floppy disk, and a blue-ray disc where disks usually reproduce data magnetically, while discs reproduce data optically with lasers. Combinations of the above should also be included within the scope of computer-readable media.

Software modules may reside in a RAM, a flash memory, a ROM, an EPROM, an EEPROM, registers, a hard disk, a removable disk, a CD-ROM, or any other form of storage medium known in the art. An illustrative storage medium may be coupled to a processor such that the processor reads information from, or writes information to, the storage medium. Alternatively, the storage medium may be integrated into the processor. The processor and the storage medium may reside in an ASIC. The ASIC may reside in a user terminal. Alternatively, the processor and the storage medium may reside as separate components in a user terminal.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the scope of the invention. Thus, the present disclosure is not intended to be limiting to the embodiments shown herein but is to be accorded the widest scope consistent with the principles and novel features disclosed herein.

Even if the illustrative embodiments may describe the use of aspects of the current disclosed subject matter in contexts of one or more independent computer systems, the subject matter of the present disclosure is not limited thereto. Rather, the subject matter may be implemented in connection with any computing environment, such as a network or distributed computing environment. Further, the aspects of the currently disclosed subject matter may be implemented in or across a plurality of processing chips and devices, and similarly, a storage may be subjected across the plurality of devices. Such devices may include personal computers (PCs), network servers, and handheld devices.

Although the subject matter has been described in language specific to structural features and/or methodological acts, it should be understood that the subject matter defined in the appended claims is not necessarily limited to the specific features or acts described above. Rather, the specific features and acts described above are disclosed as example forms of implementing the claims.

The method described herein has been described with reference to specific embodiments but may be embodied as computer-readable codes on a computer-readable recording medium. The computer-readable recording medium is any data storage device that can store data that can be thereafter read by a computer system.

Examples of the computer-readable recording medium include a ROM, a RAM, a CD-ROM, a magnetic tape, a floppy disk, an optical data storage, and the like. In addition, the computer-readable recording medium may be distributed over network-connected computer systems so that computer readable codes may be stored and executed in a distributed manner. In addition, functional programs, codes, and code segments for implementing the embodiments may be easily construed by programmers skilled in the art to which the present disclosure pertains.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for authenticating a device through an Internet of Things (IoT) cloud by using a hardware security module, the system comprising:
   an IoT device connectable to the IoT cloud which is configured to provide an IoT service; and
   the hardware security module configured to
      be connected to the IoT device, and
      generate a pair of public and private keys for authenticating the IoT device,
   wherein the IoT device is configured to
      transmit, when the IoT device is onboarding on the IoT cloud, a first device identifier to an authentication server through the IoT cloud in order to register the IoT device in the authentication server, and
      transmit a certificate generation request including the public key and a second device identifier to the authentication server through the IoT cloud in order to generate a device certificate,
   wherein the authentication server is configured to
      match the first device identifier and the second device identifier, and
      generate the device certificate in response to the match of the first device identifier and the second device identifier,
   wherein the authentication server is configured to generate a signed device certificate by signing the generated device certificate,
   wherein the IoT device is further configured to receive the signed device certificate generated by the authentication server according to the certificate generation request,
   wherein the hardware security module comprises a security storage configured to store the private key and the device certificate,
   wherein the security storage is further configured to prevent an external device from accessing a non-allowed storage area of the security storage, and
   wherein the device certificate includes the first device identifier, the second device identifier, a hardware chip identifier of a hardware chip installed in the IoT device, a random number, a transaction identifier which is generated according to an order of the certificate generation request received by the authentication server, a valid time, which indicates validity of the device certificate, a valid number of times, which indicates a number of times that the IoT device in which the device certificate is stored may communicate with a gateway installed at a specific location to be used at the specific location, an access control policy, which indicates the gateway that is accessible by the IoT device, and an encryption algorithm, which is an algorithm used for the authentication server to encrypt the device certificate.

2. The system of claim 1, wherein the IoT device is further configured to
   encrypt the certificate generation request, and
   transmit the encrypted certificate generation request to the authentication server, and
   the authentication server is configured to
      decrypt the encrypted certificate generation request, and
      generate the device certificate according to the certificate generation request.

3. A hardware security module for supporting device authentication through an Internet of Things (IoT) cloud, the hardware security module comprising:
   a microcontroller unit (MCU) including an input and output module connected to an IoT device connectable to the IoT cloud; and
   a hardware security element configured to generate a pair of public and private keys for authenticating the IoT device,
   wherein the hardware security element is configured to
      transmit, when the IoT device is onboarding on the IoT cloud, a first device identifier to an authentication server through the IoT cloud in order to register the IoT device in the authentication server, and
      transmit a certificate generation request including the public key and a second device identifier to the authentication server through the IoT cloud in order to generate a device certificate,
   wherein the authentication server is configured to
      match the first device identifier and the second device identifier, and
      generate the device certificate in response to the match of the first device identifier and the second device identifier,
   wherein the authentication server is configured to generate a signed device certificate by signing the generated device certificate,
   wherein the IoT device is further configured to receive the signed device certificate generated by the authentication server according to the certificate generation request,
   wherein the hardware security module comprises a security storage configured to store the private key and the device certificate,
   wherein the security storage is further configured to prevent an external device from accessing a non-allowed storage area of the security storage, and
   wherein the device certificate includes the first device identifier, the second device identifier, a hardware chip identifier of a hardware chip installed in the IoT device, a random number, a transaction identifier which is generated according to an order of the certificate generation request received by the authentication server, a valid time, which indicates validity of the device certificate, a valid number of times, which indicates a number of times that the IoT device in which the device certificate is stored may communicate with a gateway installed at a specific location to be used at the specific location, an access control policy, which indicates the gateway that is accessible by the IoT device, and an encryption algorithm, which is an algorithm used for the authentication server to encrypt the device certificate.

4. A method of authenticating a device through an Internet of Things (IoT) cloud by using a hardware security module, the method comprising:
provided an IoT device connectable to the IoT cloud which provides an IoT service;
generating, by the hardware security module connected to the IoT device, a pair of public and private keys for authenticating the IoT device;
transmitting, by the IoT device, when the IoT device is onboarding on the IoT cloud, a first device identifier to an authentication server through the IoT cloud in order to register the IoT device in the authentication server; and
transmitting, by the IoT device, a certificate generation request including the public key and a second device identifier to the authentication server through the IoT cloud in order to generate a device certificate,
wherein the authentication server is configured to
match the first device identifier and the second device identifier, and
generate the device certificate in response to the match of the first device identifier and the second device identifier,
wherein the authentication server is configured to generate a signed device certificate by signing the generated device certificate,
wherein the IoT device is further configured to receive the signed device certificate generated by the authentication server according to the certificate generation request,
wherein the hardware security module comprises a security storage configured to store the private key and the device certificate,
wherein the security storage is further configured to prevent an external device from accessing a non-allowed storage area of the security storage, and
wherein the device certificate includes the first device identifier, the second device identifier, a hardware chip identifier of a hardware chip installed in the IoT device, a random number, a transaction identifier which is generated according to an order of the certificate generation request received by the authentication server, a valid time, which indicates validity of the device certificate, a valid number of times, which indicates a number of times that the IoT device in which the device certificate is stored may communicate with a gateway installed at a specific location to be used at the specific location, an access control policy, which indicates the gateway that is accessible by the IoT device, and an encryption algorithm, which is an algorithm used for the authentication server to encrypt the device certificate.

5. A non-transitory computer-readable storage medium storing at least one program configured to be executed by at least one processor of a computing device, wherein the at least one program comprises instructions for performing a method comprising:
providing an Internet of Things (IoT) device connectable to an IoT cloud which provides an IoT service;
generating, by a hardware security module connected to the IoT device, a pair of public and private keys for authenticating the IoT device;
transmitting, by the IoT device, when the IoT device is onboarding on the IoT cloud, a first device identifier to an authentication server through the IoT cloud in order to register the IoT device in the authentication server; and
transmitting, by the IoT device, a certificate generation request including the public key and a second device identifier to the authentication server through the IoT cloud in order to generate a device certificate,
wherein the authentication server is configured to
match the first device identifier and the second device identifier, and
generate the device certificate in response to the match of the first device identifier and the second device identifier,
wherein the authentication server is configured to generate a signed device certificate by signing the generated device certificate,
wherein the IoT device is further configured to receive the signed device certificate generated by the authentication server according to the certificate generation request,
wherein the hardware security module comprises a security storage configured to store the private key and the device certificate,
wherein the security storage is further configured to prevent an external device from accessing a non-allowed storage area of the security storage, and
wherein the device certificate includes the first device identifier, the second device identifier, a hardware chip identifier of a hardware chip installed in the IoT device, a random number, a transaction identifier which is generated according to an order of the certificate generation request received by the authentication server, a valid time, which indicates validity of the device certificate, a valid number of times, which indicates a number of times that the IoT device in which the device certificate is stored may communicate with a gateway installed at a specific location to be used at the specific location, an access control policy, which indicates the gateway that is accessible by the IoT device, and an encryption algorithm, which is an algorithm used for the authentication server to encrypt the device certificate.

* * * * *